US012560382B2

(12) United States Patent
Hoang et al.

(10) Patent No.: US 12,560,382 B2
(45) Date of Patent: Feb. 24, 2026

(54) RADIANT HEATING ELEMENT WITH FREE END

(71) Applicant: DREVER INTERNATIONAL, Angleur (BE)

(72) Inventors: Van-Long Hoang, Angleur (BE); Alexandre Lhoest, Eupen (BE); Olivier Pensis, Montegnee (BE)

(73) Assignee: DREVER INTERNATIONAL, Angleur (BE)

( * ) Notice: Subject to any disclaimer, the term of this patent is extended or adjusted under 35 U.S.C. 154(b) by 580 days.

(21) Appl. No.: 17/784,040

(22) PCT Filed: Dec. 9, 2020

(86) PCT No.: PCT/EP2020/085276
§ 371 (c)(1),
(2) Date: Jun. 9, 2022

(87) PCT Pub. No.: WO2021/116169
PCT Pub. Date: Jun. 17, 2021

(65) Prior Publication Data

US 2023/0023783 A1 Jan. 26, 2023

(30) Foreign Application Priority Data

Dec. 10, 2019 (BE) .................................. 2019/5879

(51) Int. Cl.
*F27B 9/06* (2006.01)
*F23C 3/00* (2006.01)
*F27B 9/36* (2006.01)

(52) U.S. Cl.
CPC .............. *F27B 9/068* (2013.01); *F23C 3/002* (2013.01); *F27B 9/36* (2013.01)

(58) Field of Classification Search
CPC .... F27B 9/068; F27B 9/36; F27B 9/06; F27B 3/20; F23C 3/002; F23C 3/00;
(Continued)

(56) References Cited

U.S. PATENT DOCUMENTS 4,520,789 A * 6/1985 Rombouts .............. F23C 3/002 126/91 A
6,027,333 A * 2/2000 Fujii ....................... F23D 14/66 126/91 A
(Continued)

FOREIGN PATENT DOCUMENTS

EP 3098551 B1 1/2018
JP S50-150036 A 12/1975
(Continued)

OTHER PUBLICATIONS

Machine Translation of JP-H01150705 (Year: 1989).*
(Continued)

*Primary Examiner* — Allen R. B. Schult
*Assistant Examiner* — Amy E Carter
(74) *Attorney, Agent, or Firm* — Dickinson Wright PLLC

(57) ABSTRACT

A radiant element for heating an oven is disclosed. The radiant element comprises a first end; a second free end; a radiant structure between said first end and second end; a conduit for an energy feed inside said radiant structure; a first attachment leg for mechanically coupling the radiant structure to a support, a first coupling means comprising a first portion arranged to be stationary with respect to said support, and a second portion stationary relative to said first leg, the first portion and the second portion being mechanically coupled via a first interface so as to allow a relative displacement between the first portion and second portion.

17 Claims, 6 Drawing Sheets

(58) Field of Classification Search
CPC .. F23C 3/301; F23C 2900/03009; C21D 1/34; C21D 9/56; C21D 9/0025; F27D 99/0035; F27D 2099/0045; F27D 1/0036; F27D 99/0001; F23D 91/02; F23D 14/12; F23D 14/126; F28F 2265/26
USPC .......................................... 126/58, 91 R, 91 A
See application file for complete search history.

(56) References Cited

U.S. PATENT DOCUMENTS

| | | | | |
|---|---|---|---|---|
| 10,011,887 B2 | | 7/2018 | Bisson | |
| 2011/0120453 A1 | * | 5/2011 | Wunning | F23C 3/002 126/91 A |
| 2015/0337407 A1 | * | 11/2015 | Bisson | C21D 9/562 414/586 |
| 2016/0348896 A1 | * | 12/2016 | Lhoest | F23M 9/10 |

FOREIGN PATENT DOCUMENTS

| | | | | | |
|---|---|---|---|---|---|
| JP | H01150705 A | * | 6/1989 | F23C 3/00 |
| JP | H10237539 A | * | 9/1998 | C21D 1/34 |
| JP | 2001330209 A | | 11/2001 | |
| JP | 2005069595 A | | 3/2005 | |
| RU | 89885 U1 | | 12/2009 | |

OTHER PUBLICATIONS

Machine Translation of JP-H10237539 (Year: 1998).*
International Search Report for PCT Application No. PCT/EP2020/085276, dated Jan. 15, 2021, 4 pages.
Russian Search Report with English Translation for RU Application No. RU 2022115902, dated Mar. 25, 2024, 4 pages.

* cited by examiner

RADIANT HEATING ELEMENT WITH FREE END

CROSS-REFERENCE TO RELATED APPLICATION(S)

This present application is a national stage application of International Patent Application No. PCT/EP2020/085276, filed Dec. 9, 2020, which claims priority to Belgium Application No. BE2019/5879 filed Dec. 10, 2019, the disclosures of which are hereby incorporated by reference herein.

TECHNICAL FIELD

The invention relates to a radiant heating element for the heat treatment of products, more particularly metal products. The invention also relates to a method for attaching radiant heating elements in an oven for the heat treatment of products, more particularly metal products.

PRIOR ART

The ovens for the heat treatment of metal products, in strip form, generally comprise a series of radiant heating tubes placed one above the other and/or one next to each other in vertical and/or horizontal rows. In general, the products to be treated run vertically and/or horizontally in front of these radiant heating tubes and/or between these radiant heating tubes from which heat is emitted by radiation.

Each radiant heating tube comprises a heat source, which can for example be in the form of a burner with at least one inlet for a combustible product, at least one inlet for an oxidizer and at least one outlet for combustion products, so that, fed with a combustible product and an oxidizer, with or without a heat recovery system, the burner develops a flame within the radiant element, from which heat is then radiated towards the metal products to be treated.

The radiant heating tubes, intended to heat a metal product across its entire width and depth, are generally elongated elements that are bounded by two ends and are supported between two walls of an oven by each of their two ends. In practice, the radiant heating tubes have a first means for attaching, at the level of their first end, to a first wall of the oven comprising a feed for the heat source, and a second means for attaching at the level of their second end.

A known problem with this type of radiant heating tube is their limited service life. Indeed, this bearing mode associated with a high temperature induces constraints and structural deformations in the radiant heating tube which, following a creep phenomenon, accentuates the aging of the radiant heating tube. Indeed, it is generally observed a relaxation of the constraints which goes hand in hand with an increase of the deformations. This increase then induces eccentricities that lead to an increase of the constraints.

A known solution aiming to limit the structural constraints and deformations in the radiant heating tube is to allow one or more degrees of freedom for the second attachment means at the level of the oven wall opposite the heat feed. The advantage of having a second attachment with one or more degrees of freedom is to reduce certain thermomechanical constraints. This is in particular the case with the radiant heating tubes described in the documents US100118878B2 and JP2001330209A.

In addition, in particular because the structural constraints remain high and the heating tubes must therefore be replaced regularly, it is desired to simplify the maintenance of the ovens containing radiant heating tubes.

There are also radiant heating tubes designed to be attached under a horizontal wall. A radiant tube of such a type is described in the document JP2005069595A.

SUMMARY OF THE INVENTION

One of the purposes of the present invention is to provide a radiant heating element intended to be placed on a vertical wall and allowing a reduced and particularly easy maintenance.

To this end, the inventors propose a radiant element intended to be placed on a first vertical wall of an oven and comprising:

- a first end located on a first side of the radiant element;
- a second end located on a second side of the radiant element, the second side being opposite the first side;
- a radiant structure for heating inside said oven, located between said first end and second end;
- a conduit for an energy feed inside said radiant structure, said conduit being located on the first side of the radiant element;
- a first attachment leg for mechanically coupling the radiant structure to a support located on said first wall, said first leg being located on the first side of the radiant element; and
- a first coupling means for mechanically coupling said first leg to said support;

characterised in that the second end is free; and in that said first coupling means comprises:

- a first portion arranged to be stationary with respect to said support, and
- a second portion stationary relative to said first leg, the first portion and the second portion being mechanically coupled via a first interface so as to allow a relative displacement between the first portion and second portion.

The first coupling means allows a relative displacement between the first leg and the support. This allows to reduce or eliminate constraints caused by deformations of the radiant element, for example, due to thermal expansion/contraction. The invention allows a mechanical coupling of the radiant structure to the support (itself located on a vertical wall) on the side of the only first end of the radiant element. It is therefore different from known systems where the radiant element is attached by its two ends to vertical walls facing each other.

The radiant heating element of the invention, because it is mechanically coupled in an oven only by its end on the side of which an energy feed conduit is located, allows a simpler positioning of the latter in the oven compared to a radiant heating tube requiring attachment points at the level of its two ends. This is particularly interesting, because despite the extended of the service life of the radiant heating elements of the invention, they will nevertheless have to be replaced after a certain time. It is therefore advantageous to ensure such a replacement with a good accessibility of the attachment components. Also, it is advantageous to allow for the least labour-intensive replacement and ease of supervision of the attachment point or the attachment points during assembly, while having an extended service life of the radiant element.

A further advantage of the radiant heating element of the invention is that it can be safely mounted in an oven. Indeed, the radiant tubes of the prior art are generally positioned blindly, i.e. the operator does not see the receptacle intended to receive the second attachment component located at the level of the second end of a radiant heating tube of the prior art. As a result, the operator can never be sure that the attachment of a radiant heating tube of the prior art is correctly docked in its receptacle. This major disadvantage of the radiant heating tubes of the prior art is eliminated when using the radiant heating element of the invention having a support on one side only and having a second free end.

A further advantage of the radiant heating element of the invention is to allow a mechanical coupling of the radiant element to the oven by reducing or even eliminating the attachment or the attachments at the level of a hot area of the radiant heating element, whether this or these attachments are stationary or has a degree of mobility. This is particularly interesting because it is generally observed that at the level of the interface between a component used for mechanical coupling and the radiant structure of a radiant heating element is where the greatest constraints are concentrated, leading to accelerated degradation when the mechanical coupling takes place in a hot area. For example, the high temperature can create a diffusion bonding of parts that are supposed to move relative to each other. With the invention, an end support in hot area is advantageously eliminated.

Another advantage of the radiant heating element of the invention compared to the radiant heating tubes of the prior art comprising several attachment means positioned on either side of the radiant heating tube, is to offer a longer service life to the radiant heating element by limiting the structural constraints usually encountered at one or more attachment means, constraints related to the friction of an attachment means, to its blocking following, for example, a torsion, to its diffusion bonding.

A radiant element is normally subject to three physical stresses: its own weight (permanent), the high temperatures and the temperature variations, the pressure/depression (permanent) and the pressure/depression variations. The combinations of these stresses lead to two types of damage: creep and fatigue. The high temperatures combined with the permanent operating pressure/under pressure of the radiant element lead to a creep of the radiant element under very low stress. Also, the high temperatures combined with varying pressure/vacuum and/or temperature during operation lead to a fatigue of the radiant element under very low stress. The fatigue often occurs at areas that concentrate the constraints such as the geometric discontinuities like discontinuous section changes and the feet of the welds.

Another problem that the invention proposes to solve is to allow the discrepancies between the actual service life of a radiant element and the estimated service life to be reduced. It is observed that the radiant elements of the prior art have an actual service life that does not usually correspond to the estimated service life. The actual service life is often much less than the estimated service life, which is a problem when selecting materials for the radiant elements. The uncertainties leading to actual service life well below those estimated may arise from:

- absolute deformations undergone by the radiant element that are difficult to predict by simulation,
- relative deformations that occur when the walls of the oven deform. Thus, the opposite walls of the oven, which generally receive the rear support in hot area of a radiant heating tube of the prior art, can have different deformations, which induce constraints;
- the fact that one or more components for attaching/supporting the radiant element at the level of a hot or partially hot area of the element, due to the blind installation of a component to support the radiant element in the oven, etc.

The first side of the radiant element is closer to the first wall than the second side. The first end of the radiant element is closer to the first wall than the second end.

The interface between the first and second portions of the coupling means may be a mechanical contact, for example where the first and second portions of the coupling means are surfaces that slide over each other. The interface can also comprise an assembly of several elements forming the coupling between the first and the second portions, and comprising for example a roller, a ball, a roll, a joint, etc. The interface may comprise a sliding surface and an assembly of multiple elements.

The first portion of the coupling means can be the support itself or a portion of the support.

Preferably, the first coupling means is a bearing means allowing a relative displacement between the first leg and the support, for example in one or more directions relative to the support. For example, the relative displacement is parallel to the first wall. It may comprise a sliding bearing means, and/or a rotating bearing means, in particular, a roller or roll bearing means or a joint. The sliding and the rolling by roller allow a displacement in two directions. The rolling by roller allows a displacement in one direction only.

A free relative displacement is a relative displacement that (in ideal operation) generates very little or no mechanical moments. Preferably, the free relative motion is in two directions (e.g., parallel to the first wall), even more preferably in one direction.

The energy feed is for example the installation of a burner, which is inserted in the conduit and produces a flame inside the radiant structure. A recuperator can also be inserted into the conduit. The energy feed inside the radiant structure takes the form, for example, of the feed of hot gases from the combustion produced outside the radiant structure. For example, the energy feed is an energy source feed. In another embodiment, the feed of an energy source corresponds to the passage of an electric cable allowing to feed electric energy to electric heating means positioned inside the radiant structure (electric resistance).

According to a preferred embodiment of the radiant element, the conduit is mechanically coupled to the radiating structure in a stationary manner and to the support in a movable manner, for example by means of a compensator. A compensator is, for example, a part that accommodates mechanical displacements. For example, a compensator has the shape of a flexible bellows. Preferably, a compensator allows to realize a sealing between the atmosphere of the oven and the external environment. Preferably, the conduit is assembled to the radiant structure, more preferably, it is welded. More preferably, the conduit is straight.

Preferably, the radiant structure, the first leg and the conduit are different components that perform a different function in the radiant element.

The radiant structure of the invention is for example a radiant heating tube. The term radiant heating tube is to be understood in a broad sense; it can be a structure based on tubes (double P tubes for example), radiant boxes, etc.

Preferably, the radiant element is made of alloy, more preferably of steel, even more preferably of refractory steel or nickel-based steel. An alloy is preferably a metal alloy.

Preferably, the radiant element comprises an alloy radiant structure attached from one end only (and thus having a free end), which is particularly advantageous in order to extend the service life of the existing radiant elements. The radiant element can be composed of several portions of different composition and/or alloy. More preferably, the first leg is made of alloy, for example steel.

For example, the radiant structure is a metal radiant tube. For example, the radiant structure is a structure based on metal radiant tubes. For example, the radiant structure is a metal radiant box.

Any other material such as ceramic materials (e.g. silicon carbide) are covered by the invention.

The radiant structure may comprise at least some of the characteristics of the radiant structure described in the document EP3098551.

The radiant structure is a portion of the radiant element capable of radiating heat to a product, preferably a strip, even more preferably a metal strip. Preferably, the conduit is oriented along the axis from the first end to the second end, preferably the conduit is connected to the first end. Preferably, there is a permanent support between the first leg and the support, by means of the first coupling means, to allow a relative displacement between the first leg and the support.

The support allows the radiant structure to be coupled to the first wall. The support is an anchoring element, for example, the support is an anchoring element on the first wall of the oven. The support is preferably vertical. The support is a separate element from the radiant element. It allows the radiant structure to be coupled to the first wall.

According to a preferred embodiment, the support is a plug, for example, an element allowing to close an opening in an oven wall. Preferably, the support is attached to the oven wall so as to provide a docking point for maintaining the position of the radiant heating element in the oven while allowing a free relative displacement of the first leg to be possible and such free relative displacement, (in ideal operation) generates very little or no mechanical moments in the structure of the radiant heating element due to thermal deformation of one or more components of the radiant heating element, in particular of the radiant structure. The functions that allow to ensure the support in the form of a plug can be summarized as follows:

- ensure the support of the radiant heating element;
- ensure the handling of the radiant heating element;
- ensure an easy assembly;
- ensure the seal between the inside of the oven and the outside of the oven at the level of the wall to which the radiant heating element is attached.

According to another embodiment, the support is the wall of an oven to which, the radiant element of the invention is mechanically coupled so as to provide support for the radiant heating element. In this embodiment, a hook is attached to the wall of the oven, for example.

According to one embodiment, the radiant element is provided so that said first interface is at a lower temperature than the interior of the oven. Indeed, as the relative displacement occurs on the first interface, it is particularly interesting that it is at a lower temperature than the oven to avoid a bonding between the first portion and the second portion of the first coupling means, which would harm this relative displacement. This allows to transfer the areas with the highest constraints to a cold area, and thus to increase the mechanical strength of the first interface, in which particularly high constraints are found.

For example, an insulator may be arranged to form a thermal insulation between (i) the first interface, and (ii) the radiant structure and/or the interior of the oven. Other means for achieving a lower temperature are possible within the scope of the present invention, such as a cooling system.

According to an embodiment, said first leg is provided to be in support or in traction on said support by means of said first coupling means. It is usually in traction if it is higher than the centre of mass of the radiant element. It is usually in support if it is lower than the centre of mass of the radiant element. Being in support allows the second portion of the first coupling means to come into contact with the first portion of the first coupling means by the action of gravity, whereas being in traction generally requires a retaining of the second portion of the first coupling means with respect to the first portion. A certain mechanical construction of the first coupling means may be suitable for a traction only, a support only, or may be suitable for both.

According to an embodiment, the first coupling means is arranged to allow a relative displacement parallel to said first wall between said first leg and said support. This allows to prevent the second portion of the first coupling means from entering or leaving the support.

According to an embodiment, said first interface allows a sliding and/or a rolling, preferably a sliding and/or a rolling of the second portion with respect to the first portion. The sliding is particularly interesting because it is simple to implement and allows a lot of freedom in the displacement. It is particularly adapted to the case where the leg is supported on the support.

According to an embodiment, said first leg comprises a first leg wall, in the extension of said radiant structure and/or forming an at least partial envelope of said radiant structure, between said radiant structure and said first coupling means.

Preferably, the first leg comprises at least one opening, which may be referred to as first opening. This opening allows to reduce the constraints concentrations. It is preferably located in the first leg wall.

According to an embodiment, said second portion of the first coupling means comprises a first leg end plate, which plate is vertical. If the first portion of the first coupling means comprises a roller, the end plate can roll (and possibly slide) on this roller. If the first portion of the first coupling means comprises a sliding surface, the end plate can slide on it. If the first portion of the first coupling means comprises hooks, the end plate may comprise holes in which the hooks engage.

Preferably, the radiant element comprises a second attachment leg for mechanically coupling the radiant structure to said support, and a second coupling means for mechanically coupling said second leg to said support;

- said second leg being positioned around said conduit or positioned on a different side of said conduit than the first leg;
- said second coupling means comprising:
- a first portion arranged to be stationary with respect to said support, and
- a second portion stationary with respect to said second leg, the first portion and the second portion being mechanically coupled via a second interface so as to allow a relative displacement between the first portion and the second portion.

Preferably, the first coupling means and second coupling means are separate. For example, the conduit is positioned between the first coupling means and second coupling means.

Preferably, the first leg and second leg are located between the radiant structure and the support; they allow the radiant structure to be supported on the support while allowing a free deformation.

According to this preferred embodiment, the radiant structure is mechanically coupled to the wall of an oven by means of the first leg and the second leg. The first leg and second leg are not part of the radiant structure. They can be used to stiffen the radiant structure. The first leg and second leg contribute in particular to ensuring a function of attaching the radiant structure to the wall of the oven, by means of the support, whether it is in the form of a wall hook and/or a plug.

According to a preferred embodiment, the first leg is mechanically coupled to the support in a first coupling area and the second leg is mechanically coupled to the support in a second coupling area, to allow a displacement of each of the legs relative to the support so that deformations related to the thermal and/or mechanical deformation of the radiant element (of the radiant structure in particular) cause as little constraints as possible in the radiant element. Preferably, the second leg is made of alloy, for example (steel).

According to a preferred embodiment, the support comprises a second support segment for mechanically coupling the second leg and a first support segment for mechanically coupling the first leg. Preferably, the second support segment and first support segment are adjoined or even mechanically coupled when attached to an oven wall.

Preferably, the second leg is in support or in traction on the support by means of the second coupling means.

Preferably, there is a recessed area located between the first leg and second leg.

Preferably, the radiant element, in particular its second leg, is arranged so that said second interface is at a lower temperature than the interior of the oven, for example by means of an insulator forming a thermal insulation between, on the one hand, the radiant structure and/or the interior of the oven, and, on the other hand, said second interface.

Preferably, the first coupling area (in which the first interface is located) and the second coupling area (in which the second interface is located) are separate. Distinct means that they are not confused. Even more preferably, the first coupling area and the second area are located on either side of the energy feed conduit.

Preferably, the first leg and second leg protrude from the radiant structure toward the first end, in line with the radiant structure. Preferably, the first and second attachment legs overlap at least partly around said conduit.

According to an embodiment of the invention, the first and second attachment legs are adjacent to the radiant structure, preferably extending the radiant structure, or in another preferred manner, welded thereto, or in another more preferred manner, welded thereto so as to ensure a structural continuity in extension of the radiant structure.

In another embodiment, the second leg is positioned around said conduit. Preferably, an insulation layer is positioned between the conduit and the first and/or second leg in order to limit the heat transfers.

According to a preferred embodiment the first coupling means comprises at least one means for anchoring the second leg to the support. Preferably, said second leg is pierced by at least one hole or comprises a threaded part for provided to be bolted to said support. An anchoring of the second leg with the support by the use of bolts, rivets, welds or any other attachment means is covered by the invention.

According to another preferred embodiment, the second leg comprises a reinforcement assembly to stiffen it, more preferably, the reinforcement assembly is attached to the second leg, even more preferably, the reinforcement assembly is welded to the second leg. In a particular embodiment, the reinforcement assembly comprises: a base reinforcement part, two lateral reinforcement parts in the form of lateral walls, an upper reinforcement part in the form of a wall, the reinforcement assembly being attached to the first leg end plate, and/or to the second leg.

Preferably, the reinforcement assembly further comprises a stiffener, more preferably, at least two stiffeners, even more preferably, the stiffener or the stiffeners are vertical.

Preferably, the second leg comprises at least one opening, which may be referred to as second opening. This opening allows to reduce the constraints concentrations. It is preferably located in the second leg wall.

Preferably, the second leg comprises a second leg wall, in the extension of the radiant structure and/or forming an at least partial envelope of said radiant structure, between the radiant structure and the second coupling means.

Preferably, the second leg comprises a first wall and a second leg wall, which walls each comprise a second opening.

Preferably, the second leg comprises a second leg end plate forming a second leg surface attached to the second leg wall at the level of the first end of the second leg to mechanically couple the second leg to the support by means of the second coupling means. A second leg end corresponds to the interface between the second leg and the radiant structure.

Preferably, the radiant element further comprises a third leg positioned between the first leg and the second leg.

Preferably, the radiant element further comprises a third coupling means for mechanically coupling the third leg to the support.

Preferably, the third leg is in support on the support or in traction by means of the third coupling means.

Preferably, the third coupling means is a bearing means configured to allow a free relative displacement of said third leg in one direction with respect to said support, more preferably the bearing means is a rotary bearing means, even more preferably a roll or roller bearing means.

Preferably, the third coupling means is a sliding bearing means configured to allow a free relative displacement of the third leg in one direction with respect to said support.

Preferably, the support comprises an insulation layer positioned to surround the first leg and/or second leg and/or third leg and/or the conduit at least partly.

According to another embodiment, when the support is a plug, a support insulator is positioned on the support so as to surround the first and/or the second leg and/or the third leg at least partly. This is particularly advantageous because such an insulator allows to reduce heat loss to the outside of an oven through the plug. When the support is the wall of the oven, a support insulator is also positioned around the first and/or the second leg.

Preferably, the radiant structure comprises a first bent wall and a second bent wall connected along a first edge and a second edge so that the radiant structure has, in cross-section, a lenticular section, more preferably having a chord.

Preferably, a first wall and a second wall mechanically coupled at their two facing ends so as to form a first edge and a second edge.

According to another embodiment, the radiant structure comprises a single wall folded shaped like a teardrop along a cross-section. Such a teardrop shape is obtained for example by partially winding a wall so as to obtain a wall shaped like a U comprising two facing ends. These can then be mechanically coupled (preferably welded) so as to form an edge. One edge may have a slight flatness or an overlap of the two facing ends.

The invention as well as all embodiments of the invention can be applied to radiant tubes of various kinds, for example of the type: P, double P, U, W, I, etc.

According to one contemplated embodiment, the radiant element comprises a W-shaped radiant structure developed between the conduit and an outlet nozzle.

The invention also provides an oven segment of an oven comprising a first vertical oven wall and a first radiant element according to one embodiment of the invention, the support of the first radiant element being attached to or located only on the first oven wall, more preferably the support of the first radiant element being attached only to the first oven wall. In other words, the support is not mechanically coupled to a second wall of the oven.

All the embodiments and the variants provided for the radiant element according to the invention are applicable to the oven segment according to the invention, mutatis mutandis.

In an embodiment, said first leg is located lower than said conduit. It is preferably in support on the support. Indeed, because of the torque due to gravity, this lower leg presses on the wall, which simplifies the implementation of a movable coupling compared to an upper leg which would be in traction on the wall.

Preferably, the oven segment further comprises another radiant element, the support of the second radiant element being attached to the second oven wall.

The invention also provides an oven comprising a plurality of radiant elements according to the invention, or, a plurality of oven segments according to the invention, the oven having an oven width for heat treating a strip having a strip width.

All embodiments and variants provided for the radiant element according to the invention, for the oven segment according to the invention are applicable to the oven according to the invention, mutatis mutandis.

Preferably, the radiant structures of the plurality of radiant elements occupy substantially the entire width of the oven.

The inventors further provide a method for attaching a radiant element to a first vertical wall of an oven for heat treating a product, said method comprising the following steps:

- a. providing a radiant element comprising:
  - a first end located on a first side of the radiant element;
  - a second free end located on a second side of the radiant element, the second side being opposite the first side;
  - a radiant structure for heating inside said oven, located between the first end and the second end;
  - a conduit for an energy feed inside said radiant structure, said conduit being located on the first side of the radiant element;
  - a first attachment leg located on the first side of the radiant element,
- a first coupling means comprising:
  - a first portion, and
  - a second portion stationary with respect to said first leg, the first portion and the second portion being adapted to be mechanically coupled via a first interface so as to allow a relative displacement between the first portion and the second portion;
- b. placing said radiant element on said first wall so that:
  - the second end is free;
  - the first attachment leg mechanically couples the radiant structure to a support located on said first wall;
  - the first coupling means mechanically couples said first leg to said support;
  - the first portion of the first coupling means is stationary relative to said support; and
  - the second portion of the first coupling means is mechanically coupled to the first portion via the first interface so as to allow a relative displacement between the first portion and second portion.

Preferably, the radiant element provided in the step a. further comprises the support; and the step b. comprises locating the support on said first wall.

Preferably, the radiant element provided in the step a. further comprises a second attachment leg for mechanically coupling the radiant structure to said support, and a second coupling means for mechanically coupling said second leg to said support;

- said second leg being positioned around said conduit or positioned on a different side of said conduit than the first leg;
- said second coupling means comprising:
  - a first portion arranged to be stationary with respect to said support, and
  - a second portion stationary relative to said second leg, the first portion and the second portion being mechanically coupled via a second interface so as to allow a relative displacement between the first portion and second portion; and the step b. such that
    - the second attachment leg mechanically couples the radiant structure to the support;
    - the second coupling means mechanically couples said second leg to said support;
    - the first portion of the second coupling means is stationary relative to said support; and
    - the second portion of the second coupling means is mechanically coupled to the first portion via the second interface so as to allow a relative displacement between the first portion and second portion of the second coupling means.

All embodiments and variants provided for the radiant element according to the invention, for the oven segment according to the invention and for the oven according to the invention are applicable to the method of the invention, mutatis mutandis.

A product in the sense of the invention may be a strip, a plate, a slab; metallic or non-metallic; magnetic or non-magnetic.

BRIEF DESCRIPTION OF FIGURES

Further characteristics and advantages of the invention will become apparent from the following detailed description, for the understanding of which reference is made to the appended figures, among which.

The drawings in the figures are not to scale. Generally, similar elements or components are denoted by similar references in the figures. The presence of reference numbers in the drawings shall not be considered limiting, even when such numbers are indicated in the claims.

DETAILED DESCRIPTION OF SOME EMBODIMENTS OF THE INVENTION

Figure 1:
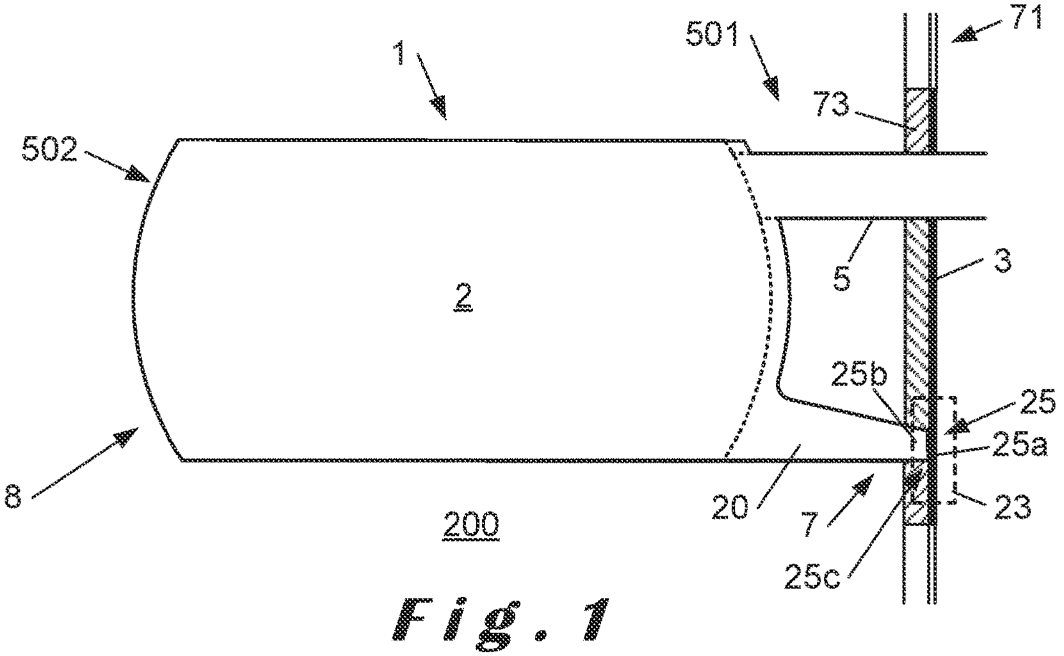
FIG. 1 shows an embodiment of the invention.

FIG. 1 shows an example of an embodiment of the radiant element 1 of the invention. The radiant element 1 is intended to be placed on a first vertical wall 71 of an oven 200, by means of a support 3 which may be an integral part of the first wall 71 or a part attached to the first wall 71.

The radiant element 1 comprises a radiant structure 2 located between a first end 7 located on a first side 501 of the radiant element 1, and a second end 8 located on a second side 502 of the radiant element 1, the second side 502 being opposite the first side 501. The second end 8 is free, so it is not directly mechanically coupled to a wall of an oven, but it is mechanically coupled to the first wall 71 of an oven, by means of the support 3, through the radiant structure 2 and the first leg 20 (which will be described below).

The radiant element 1 comprises a conduit 5 connected to the radiant structure 2 so that the conduit 5 allows the feed of an energy source inside the radiant structure 2. The conduit 5 is generally connected to an energy source feed through the first wall 71. The conduit 5 is located on the first side 501 of the radiant element 1.

The radiant element 1 comprises a first attachment leg 20 for mechanically coupling the radiant structure 2 to the support 3. The first leg 20 is mechanically coupled to the support 3 by means of a first coupling means 25. The first coupling means 25 comprises a first portion 25*a* arranged to be stationary relative to said support 3, and a second portion 25*b* stationary relative to said first leg 20. Thus, when the first leg 20 moves, the second portion 25*b* follows the displacement, which is generally due to thermo-mechanical deformations. The first portion 25*a* is immobile as long as the support 3 is immobile. The second portion 25*b* is immobile as long as the first leg 20 is immobile. The coupling between the first 25*a* and second 25*b* portions is a first interface 25*c* that comprises all mechanical contacts between the first 25*a* and the second 25*b* portions, including any movable parts providing those mechanical contacts. The first interface 25*c* is located in a first coupling area 23, and allows a relative displacement between the first leg 20 and the support 3 by making possible a relative displacement between the first portion 25*a* and second portion 25*b* of the first coupling means 25.

Figure 4A:
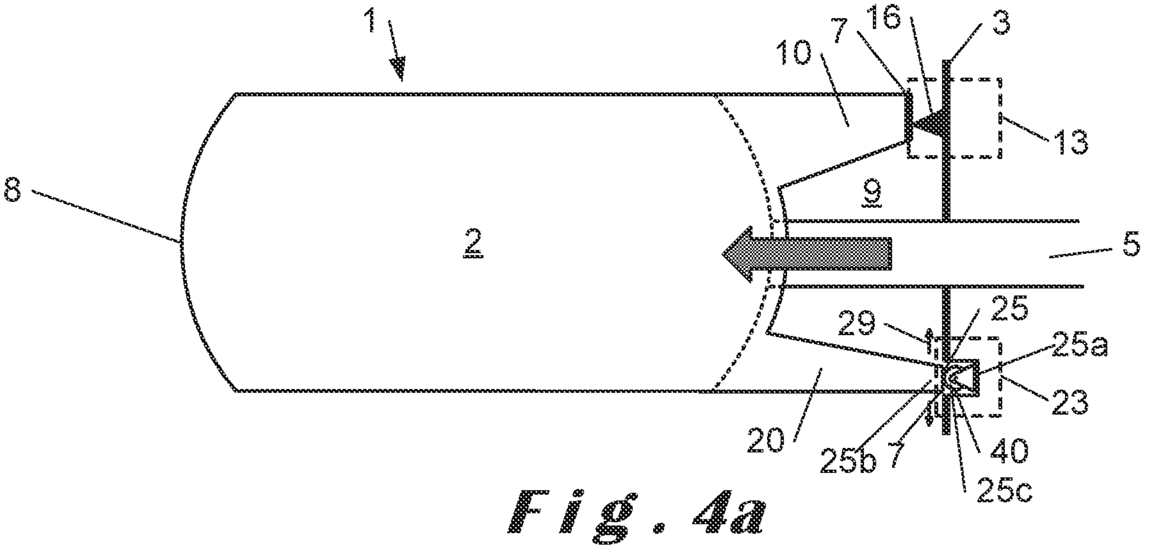
FIGS. 4*a*, 4*b*, 4*c* show preferred embodiments of the invention.
Figure 4B:
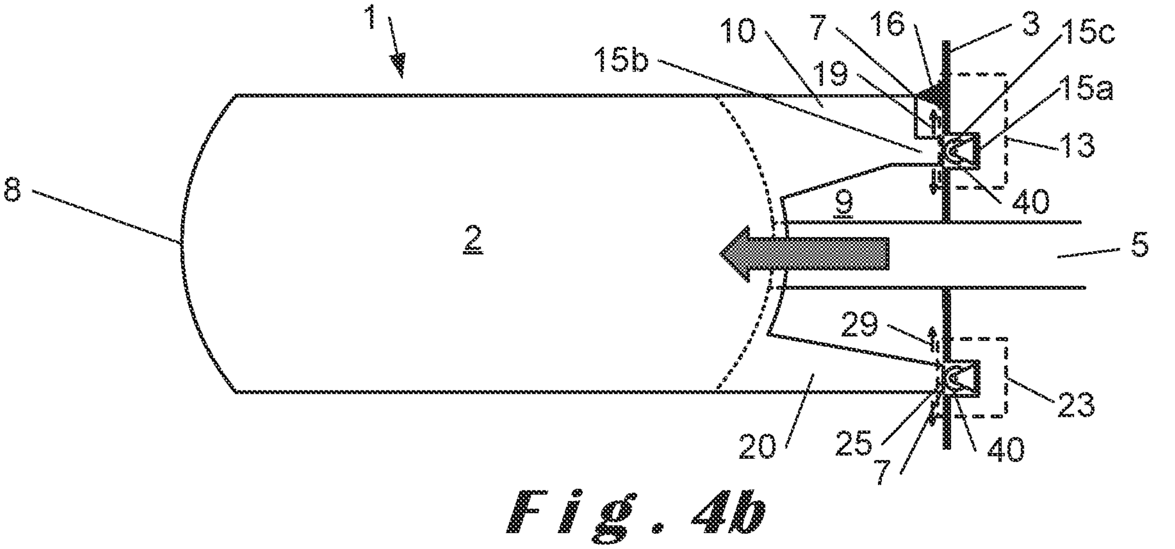
Figure 4C:
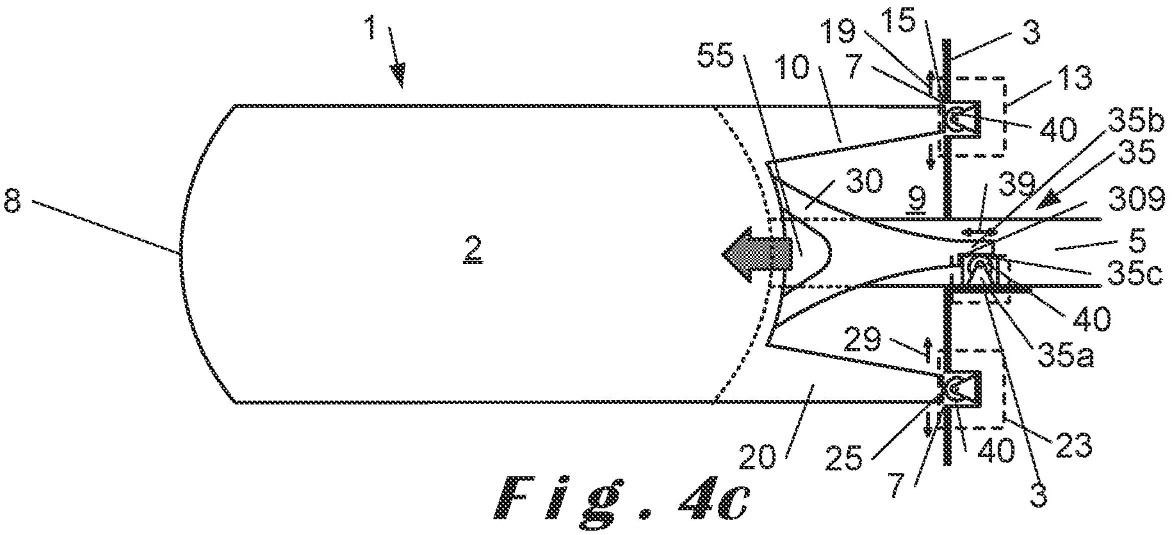

For example, the first coupling means 25 is a bearing means configured to allow a free relative displacement of the first leg 20 with respect to the support 3. For example, the bearing means is a roll bearing means 40 as shown in FIG. 4*a*, 4*b* or 4*c*. For example, the bearing means is a sliding means as shown in FIG. 1, where the first portion 25*a* is a surface of the support 3, the second portion 25*b* is an end surface of the first leg 20 that slides on said surface of the support 3, and the interface 25*c* is the interface between these surfaces. In the example shown in FIG. 1, the first leg 20 is resting on the support 3.

FIG. 1 further allows to illustrate an insulator 73 used in a preferred embodiment of the invention, and forming a thermal insulation between, on the one hand, the radiant structure 2 and the interior of the oven 200, and, on the other hand, the first interface 25*c*. The end of the second portion 25*b*, which belongs to this first interface 25*c* is thus in a cold area. The support insulator 73 is preferably positioned at the level of the first end 7 and against the support 3.

Figure 2:
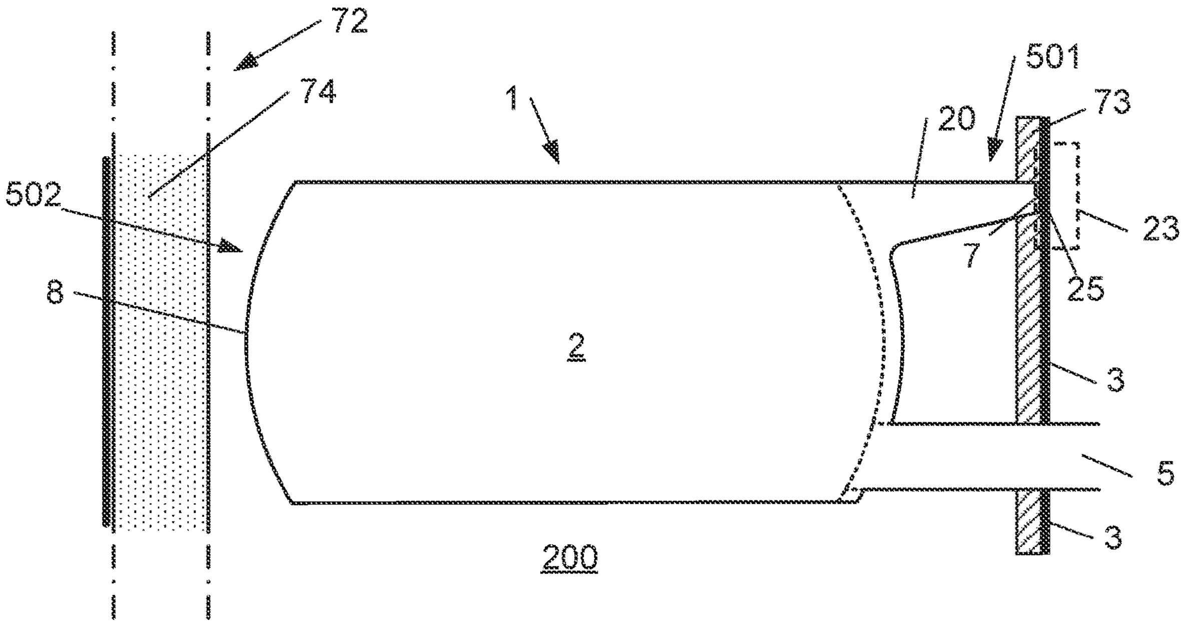
FIG. 2 shows an embodiment of the invention.

FIG. 2 further allows to illustrate a second oven wall 72 that is vertical and has a wall insulation layer 74 shown with a dot texture. In the example shown in FIG. 2, the first leg 20 is in traction on the support 3. The coupling means 25 preferably comprises retaining elements, such as attachment holes 101 (shown in FIG. 9) coupled to attachment means, allowing a relative displacement.

FIGS. 3*a*, 3*b*, 3*c*, 4*a*, 4*b* and 4*c* show example embodiments of the invention, in which the radiant element 1 comprises a second attachment leg 10 mechanically coupling the radiant structure 2 to the support 3. A second coupling means 15 mechanically couples the second leg 10 to the support 3. The second leg 10 is positioned around the conduit 5 or positioned on a different side of the conduit 5 than the first leg 20. The second coupling means 15 comprises a first portion 15*a* arranged to be stationary relative to the support 3, and a second portion 15*b* stationary relative to the second leg 10. The first portion 15*a* and the second portion 15*b* are mechanically coupled via a second interface 15*c*, preferably so as to allow a relative displacement between the first portion 15*a*, and second portion 15*b*.

The second leg 10 and first leg 20 are preferably separate and connected to the radiant structure 2. Between the first leg 20 and the second leg 10, there is a recessed area 9. The first leg 20 and second leg 10 are preferably mechanically coupled by means of the radiant structure 2. The first leg 20 and second leg 10 protrude from the radiant structure 2. For example, the conduit 5 is positioned between the first leg 20 and second attachment leg 10.

Figure 3A:
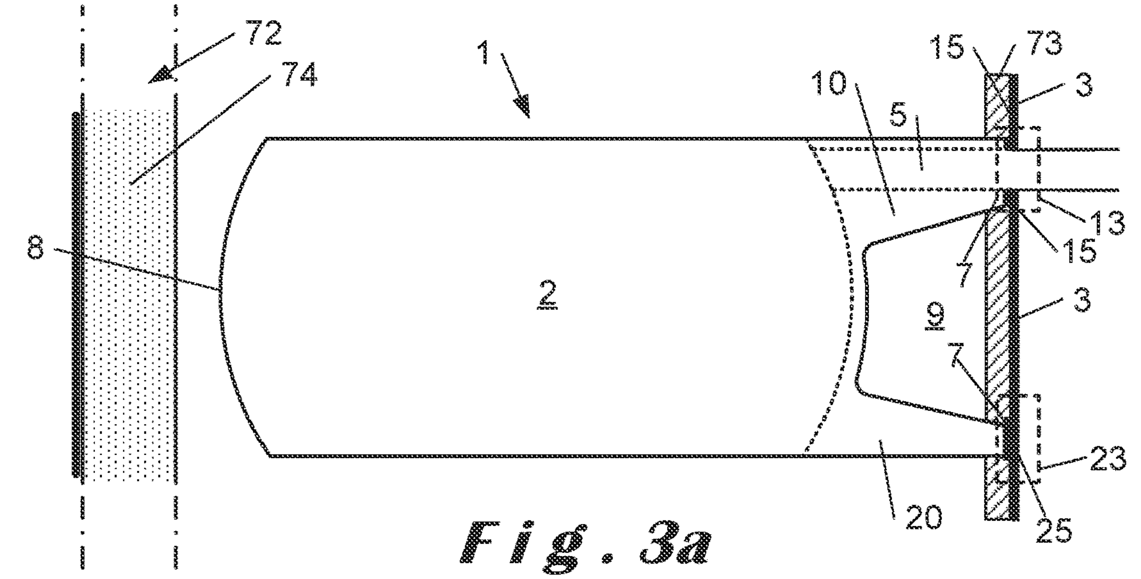
FIGS. 3*a*, 3*b*, 3*c* show preferred embodiments of the invention.
Figure 3B:
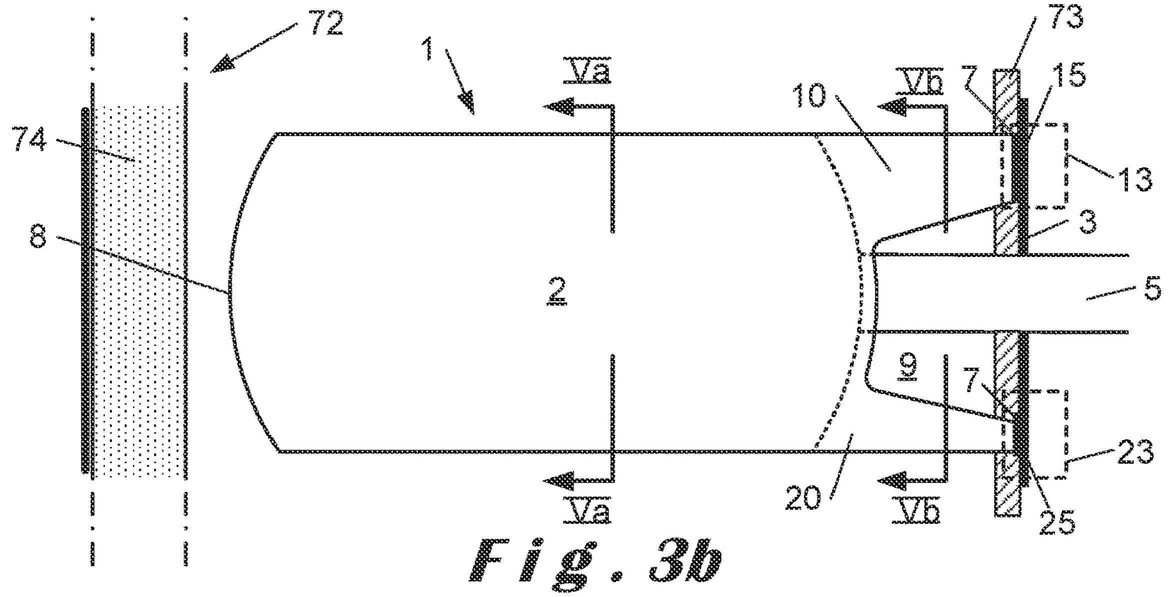
Figure 3C:
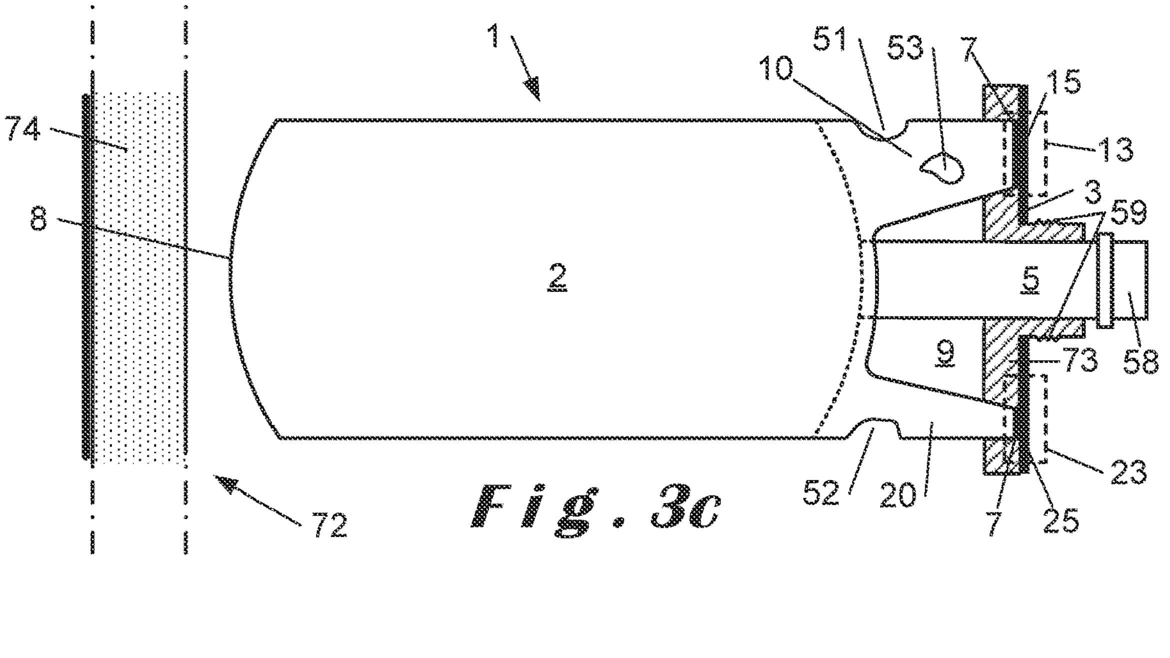

FIGS. 3*a*, 3*b*, 3*c* show the second oven wall 72, which is vertical and located opposite the first oven wall 71 to which the support 3 is attached. The second end 8 of the radiant element 1 is therefore free from the second oven wall 72. A support insulation layer 73 is also provided at the level of the first end 7 of the radiant element 1, against the support 3. This support insulation layer 73 is shown only in some figures, but in a preferred implementation of the invention, it is present in all embodiments of the invention.

FIG. 3*a* repeats some of the characteristics of FIG. 1 and additionally comprises the second leg 10 which is positioned around the conduit 5. According to a particularly advantageous embodiment, a conduit insulator is positioned, at least partially, between the conduit 5 and the second leg 10 so as to thermally insulate the second leg 10 from the heat emitted by the conduit 5.

FIGS. 3*b*, 3*c*, 4*a*, 4*b*, 4*c* show the radiant element 1 in which the conduit 5 is positioned between the first leg 20 and the second leg 10.

FIG. 3*c* also shows a compensator 59 attached to the support 3 allowing to ensure a mechanical coupling of the conduit 5 with the support 3. The compensator 59 is preferably insulated from the conduit 5, except for the portion facing the compensator 59 in contact with the conduit 5. A burner 58 is shown at the end of the conduit 5. The burner 58 is connected to the end of the conduit 5.

FIG. 3*c* also shows a lower leg end opening or first opening 52, located on the first leg 20. This opening 52 is located at the level of the lower end of the first leg 20. In the embodiment shown in FIG. 5*b*, the first opening 52 would be made in, for example, the first wall 202A and the second wall 202B of the first leg 20. FIG. 3*c* further shows an upper leg end opening or second opening 51, located on the second leg 10. This opening 51 is located at the level of the upper end of the second leg 10. In the embodiment shown in FIG. 5*b*, the second opening 51 would be made, for example, in the first wall 102A and in the second wall 102B of the second leg 10. In addition, FIG. 3*c* shows a leg centre opening 53 or wall opening 53 located in the second leg 10 in an area away from the ends of the second leg 10. Preferably, the first wall 102A and the second wall 102B of second leg 10 shown in FIG. 5*b* each comprise a wall opening 53, preferably a wall opening 53 is a substantially simple shaped opening. Similar leg centre openings 53 may be made in the first leg 20 and/or third leg 30 (not shown).

In FIG. 4*a*, the second coupling means 15 is an attachment means 16 for immovably attach the second leg 10 to the support 3 at the level of the second coupling area 13. The attachment means 16 is represented by a triangle. The first coupling means 25 is configured to mechanically couple the first leg 20 to the support 3 at the level of the first coupling area 23 and allows a relative displacement between the first leg 20 and the support 3, via the interface 25*c* between the first 25*a* and second 25*b* portions of the coupling means 25. For example, the first coupling means 25 is a bearing means configured to allow a free relative displacement of the first leg 20 along a single first direction 29 with respect to the support 3, and/or parallel to the first wall 71 (potentially with a component of the direction of displacement perpendicular to FIG. 4*a*). For example, the bearing means is a roll or sliding bearing means 40. The arrows shown around the first coupling means 25 show the first, vertical direction 29 of relative displacement of the first coupling means 25.

In FIG. 4*b*, the radiant element 1 differs from the embodiment shown in FIG. 4*a* in that the second coupling means 15 comprises two coupling devices:

- a first free coupling device allowing a relative displacement between the first 15*a* and second 15*b* portions of the coupling means. The arrows shown in FIG. 4*b* around the coupling means of the second free coupling device show a second direction 19 of the relative displacement of the coupling means;
- a second, stationary coupling device comprising an attachment means 16 for attaching the second leg 10 to the support 3.

In FIG. 4*c*, the radiant element 1 comprises:

- a second leg 10 mechanically coupled to the support 3 by means of a second coupling means 15 at the level of the second coupling area 13, the second coupling means 15 allows a relative displacement between the second leg 10 and the support 3. The arrows shown in FIG. 4*c* around the second coupling means 15 show the second direction 19 of the relative displacement of the second coupling means 15;
- a first leg 20 mechanically coupled to a support 3 by means of a first coupling means 25 at the level of the first coupling area 23, the first coupling means 25 allows a relative displacement between the first leg 20 and the support 3. The arrows shown in FIG. 4*c* around the first coupling means 25 show the first direction 29 of the displacement of the first coupling means 25. For example, the first coupling means 25 for this embodiment is a bearing means, more preferably, this coupling means is a roll bearing means 40 or sliding bearing means;
- a third leg 30 mechanically coupled to the support 3 by means of a third coupling means 35 at the level of a third coupling area 33 (shown in FIG. 7), the third coupling means 35 allows a relative displacement between the third leg 30 and the support 3. The arrows shown in FIG. 4*c* around the third coupling means 35 show the third direction 39 of the relative displacement of the third coupling means 35.

The third coupling means 35 comprises a first portion 35*a* arranged to be stationary relative to the support 3, and a second portion 35*b* stationary relative to the third leg 30, the first portion 35*a* and the second portion 35*b* being mechanically coupled via a third interface 35*c* so as to allow a relative displacement between the first portion 35*a* and second portion 35*b*. Preferably, the third leg 30 is intended to be in support or in traction on the support 3 by means of the third coupling means 35. The radiant element is arranged so that the third interface 35*c* is at a lower temperature than the interior of the oven 200.

In FIG. 4*c*, the second coupling means 15 allows a relative displacement between the second leg 10 and the support 3 along the second direction 19, preferably only along this second direction 19. The first coupling means 25 allows a relative displacement between the first leg 20 and the support 3, parallel to the first wall 71, for example along the first direction 29, preferably only along this first direction 29. The third coupling means 35 allows a relative displacement between the third leg 30 and the support 3 along the third direction 39, preferably only along this third direction 39.

Preferably, the first direction 29 and the second direction 19 are substantially orthogonal to a main direction of the radiant structure 2 from the first end 7 to the second end 8. Preferably, the first direction 29 and the second direction 19 are a vertical direction, i.e., they are substantially parallel to a vertical wall of an oven. Preferably, the first direction 29 and second direction 19 are parallel, more preferably, they are merged. Preferably, the third direction 39 is substantially parallel to a main direction of the radiant structure 2 from the first end 7 to the second end 8. Preferably the third direction 39 is a horizontal direction i.e. it is essentially orthogonal to a vertical wall of an oven. Preferably, the first direction 29 and second direction 19 are substantially orthogonal to the third direction 39.

Preferably, the third leg 30 shown in FIG. 4*c* comprises:

- a first end of the third leg 30 mechanically coupled to said support 3 by means of the third coupling means 35;
- a second end of the third leg 30 attached to the radiant structure 2.

Preferably the second end of third leg 30 comprises two attachment segments for mechanically attaching to the radiant structure 2 so that there is a third leg opening 55 between the radiant structure 2 and the two attachment segments of the second end of third leg 30. The advantage of this third leg opening 55, like the one shown in FIG. 3*c* as a recessed area 9 by way of example, is that it allows for a reduction in constraints at the level of the attachment of the third leg 30 to the radiant structure 2. Indeed, this third leg opening 55 allows to limit the constraint concentrations related to the thereto-mechanical deformation. The conduit 5 is partially represented in broken lines so as to better show the latter which is partially covered by the third leg 30, the conduit 5 on this FIG. 4*c* is however similar to the conduits 5 represented in FIGS. 3*a* to 4*b*.

Figure 5A:
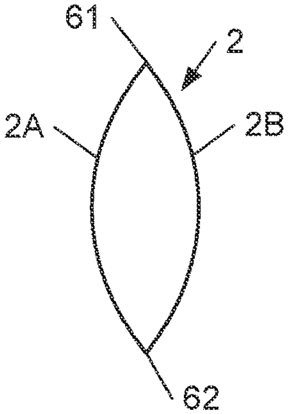
FIGS. 5*a*, 5*b* show a preferred embodiment of the invention.
Figure 5B:
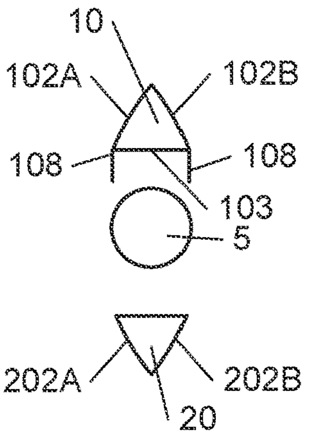

In FIGS. 5*a* and 5*b* are cross-sectional views of FIG. 3*b*. The cross-sectional area shown in cross-section Va in FIG. 5*a* is lenticular. A lenticular section is characterised by a first substantially bent wall 2A and by a second substantially bent wall 2B, both of which are mechanically coupled at their two facing ends and form a first edge 61 and a second edge 62.

A cross-sectional area made at the level of the first leg 10 and of the second leg 20 is shown in FIG. 5*b*. It corresponds to the cross-sectional view Vb of FIG. 3*b*. The extension of the first lateral wall 2A and second wall 2B can be closed, for example by a base reinforcement part 103. The second leg 10 comprises components of a reinforcement assembly in order to ensure a good rigidity of the second leg 10 and in particular in order to prevent torsional deformations, i.e. to prevent deformations in a direction different from the direction from the second leg 10 to the first leg 20. Such a reinforcement assembly allow to ensure good rigidity of the second leg 10 is for example one or more vertical stiffeners 108. A vertical stiffener 108, shown here in a direction substantially longitudinal to the second leg 10 may, in another embodiment, be positioned in a direction substantially transverse to the second leg 10. In FIG. 5*b*, the first leg 20 comprises an extension of the first wall 2A and the second wall 2B which form, respectively, a first wall 202A and a second wall 202B of the first leg 20. Thus, the first leg 20 (respectively second 10) may be formed of the first 202A (respectively 102A) and second 202B (respectively 102B) walls, optionally with the base reinforcement part 103. The embodiment of FIGS. 5*a* and 5*b*, and in particular the embodiment of the radiant structure 2 can be applied to the embodiments of FIGS. 1, 2, 3*a*, 3*b*, 3*c*, 4*a*, 4*b*, 4*c*.

Figure 6:
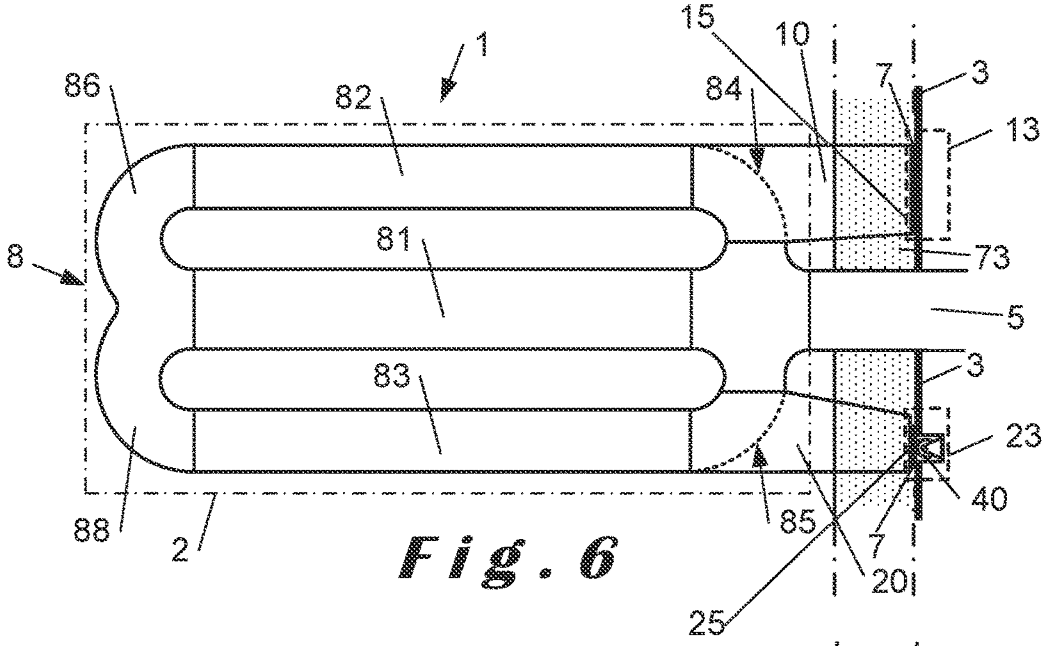
FIGS. 6 and 7 show preferred embodiments of the invention.

FIG. 6 shows a particular embodiment of the radiant element of the invention. This radiant element 1 comprises a radiant structure 2 referred to as double P. The double P radiant structure 2 comprises a first straight section 81, a second straight section 82, and a third straight section 83 extending in substantially parallel directions, between said first end 7 and said second end 8,

- said first straight section 81 and said second straight section 82 being fluidly connected:
  - at the level of said first end 7 by a first bent segment 84;
  - at the level of said second end 8 by a second bent segment 86;
- the first straight section 81 and the third straight section 83 being fluidly connected:
  - at the level of the first end 7 by a third bent segment 85;
  - at the level of the second end 8 by a fourth bent segment 88.
- The first leg 20 allows mechanically to couple the radiant structure 2 to the support 3 at the level of the first coupling area 23. For example, the first leg 20 is coupled to the third bent segment 85 and/or and the third straight section 83.
- The second leg 10 allows the radiant structure 2 to be mechanically coupled to the support 3 at the level of the second coupling area 13. For example, the second leg 10 is coupled to the second bent segment 84 and/or the second straight section 82.

Figure 7:
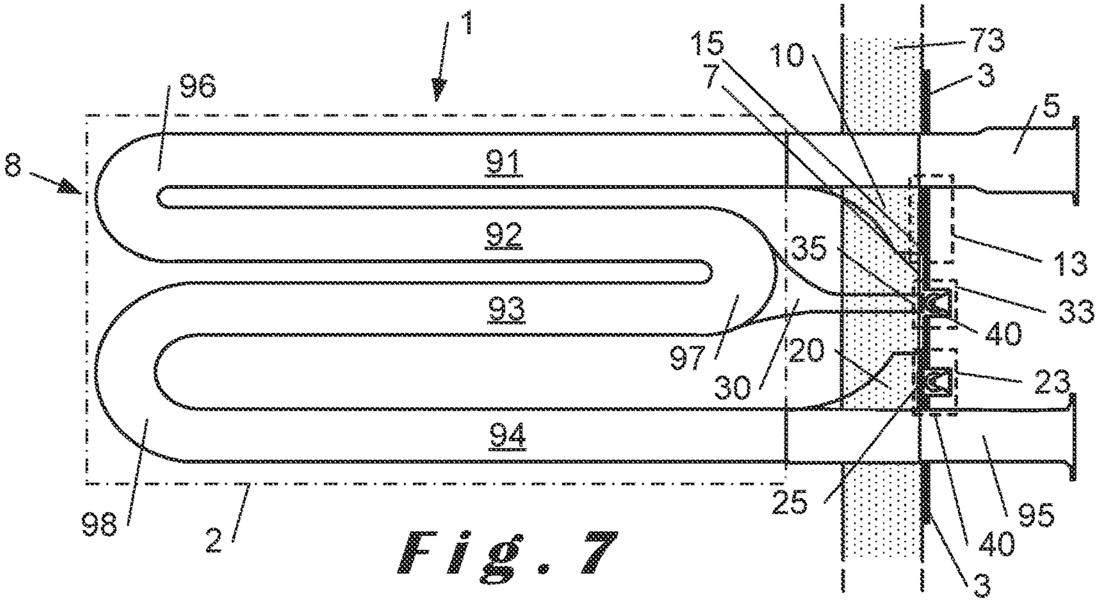

FIG. 7 shows a particular embodiment of the radiant element of the invention. This radiant element 1 comprises a radiant structure 2 referred to as W-shaped between the conduit 5 and an outlet nozzle 95. The W-shaped radiating structure 2 shown comprises a first straight section 91, a second straight section 92, a third straight section 93, and, a fourth straight section 94 extending in substantially parallel directions, between the first end 7 and the second end 8, such that:

- the first straight section 91 and the second straight section 92 are fluidly connected by a first elbow 96;
- the second straight section 92 and the third straight section 93 are fluidly connected by a second elbow 97;
- the third straight section 93 and the fourth straight section 94 are fluidly connected by a third elbow 98.

The first straight section 91 is fluidly connected to the conduit 5, and the fourth straight section 94 is fluidly connected to the outlet nozzle 95. The second leg 10 is mechanically coupled to the first straight section 91, e.g., it is attached to it. The second leg 10 allows to mechanically couple the first straight section 91 to the support 3, for example the second leg 10 allows to attach the first straight section 91 to the support 3. The first leg 20 allows to mechanically couple the fourth straight section 94 to the support 3, for example the first leg 20 allows to attach the fourth straight section 94 to the support 3. Preferably, in this embodiment, the second leg 10 at least partially surrounds the first straight section 91 and the first leg 20 at least partially surrounds the fourth straight section 94.

The second leg 10 is mechanically coupled to the support 3 at the level of the second coupling area 13 by means of the second coupling means 15. The first leg 20 is mechanically coupled to the support 3 at the level of the first coupling area 23 by means of the first coupling means 25. Preferably, the second coupling means 15 is an attachment means and the first coupling means 25 is a mechanical coupling means allowing a relative displacement between the first leg 20 and the support 3. For example, the first coupling means 25 is a roll or sliding bearing means.

In a preferred embodiment of the radiant element 1 as shown in FIG. 7, it further comprises a third leg 30 mechanically coupled to a second elbow 97, for example the third leg 30 is attached to the second elbow 97, The third leg 30 is mechanically coupled to the support 3 by means of a third coupling means 35 at the level of a third coupling area 33 and allowing a relative displacement between the third leg 30 and the support 3. For example, the third coupling means 35 is a roll or sliding bearing means.

Figure 8:
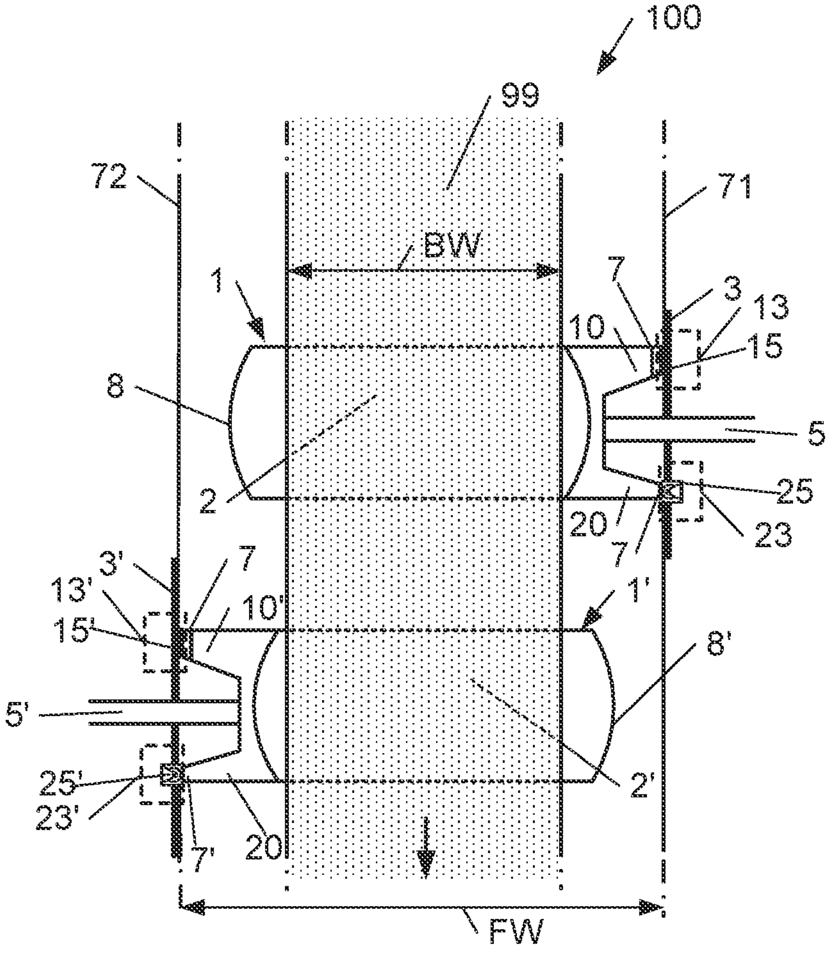
FIG. 8 shows an embodiment of an oven according to the invention.

FIG. 8 shows an oven segment 100 comprising two radiant elements 1, 1' according to the invention. The oven segment 100 comprises a first wall 71 and a second wall 72 of the oven. The oven segment 100 is configured to allow a strip 99 to pass between the first wall 71 and second wall 72 of the oven. The strip 99 runs essentially perpendicular to the first wall 71 and the second wall 72 of the oven. The first wall 71 and second wall 72 of the oven are spaced apart by a distance representing the oven width FW. A strip 99 has a bandwidth BW. The radiant elements 1, 1' are positioned so that their respective radiant structures 2, 2' allow a heat transfer to the running strip 99. Within the scope of the present invention, two successive radiant elements may also be attached to the same first wall 71.

The first radiant element 1 is attached to the first wall 71 of the oven by means of its support 3, and the second radiant element 1' is attached to the second wall 72 of the oven by means of its support 3'. The second leg 10 is attached to the support 3. The first leg 20 is mechanically coupled to the support 3 so as to allow a relative displacement between the first leg 20 and the support 3. The second radiant element 1' is attached to the second wall 72 of the oven by means of the support 3'. The second leg 10' is attached to the support 3'. The first leg 20' is mechanically coupled to the support 3' so as to allow a relative displacement between the first leg 20' and the support 3'. The conduit 5 of the first radiant element 1 opens at the level of the first wall 71 of the oven. The conduit 5' of the second radiant element 1' opens at the level of the second wall 72 of the oven.

With respect to FIG. 8, all of the described embodiments of the radiant elements 1 can be applied to the described oven segment 100. In particular, the embodiments comprising a third leg 30 or alternatively a radiant structure 2, a conduit 5, a first leg 20, and a first coupling means 25 as described with reference to the preceding figures.

Figure 9:
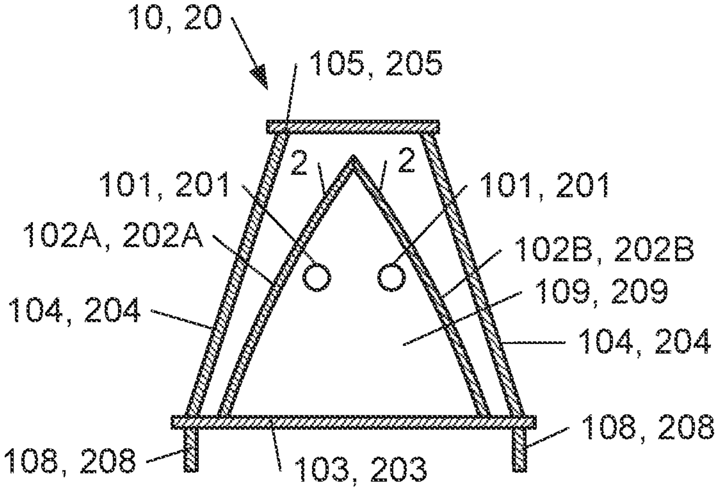
FIG. 9 shows a detailed embodiment of a leg at the level of the first end.

FIG. 9 shows an example of an embodiment of a first leg 20 or a second leg 10 at the level of the first end 7. If the considered leg is lower than the conduit 5, the figure will be preferentially inverted up-down. FIG. 9 shows a cross-sectional view of a leg (which may be the first 20 or the second 10) in which, the radiant structure 2 is extended to form said leg. This embodiment is particularly suitable for a leg in traction on the support 3. The first leg 20 22 respectively second leg 10) is connected to the support 3 by means of a base reinforcement part 203 (respectively 103). Two lateral reinforcement parts 204 (respectively 104), an upper reinforcement part 205 (respectively 105) are assembled to the base reinforcement part 203 (respectively 103). The first leg 20 (respectively second leg 10) is assembled to the base reinforcement part 203 (respectively 103). In a particular embodiment, the base reinforcement part 203 (respectively 103), the two lateral reinforcement parts 204 (respectively 104), the upper reinforcement part 205 (respectively 105) comprise: a base reinforcement part 203 (respectively 103), two lateral reinforcement parts 204 (respectively 104) in the form of walls, an upper reinforcement part 205 (respectively 105) in the form of a wall. A first leg end plate 209 (respectively second leg 109) forms a vertical wall that allows to close the assembly comprising the base reinforcement part 203 (respectively 103), the two lateral reinforcement parts 204 (respectively 104), and the upper reinforcement part 205 (respectively 105).

This first leg end plate 209 (respectively second leg 109) further allows to mechanically coupled the first leg 20 (respectively second leg 10) to the support 3, by means of the first 25 (respectively second 15) coupling means. For example, the first leg end plate 209 (respectively second leg 109) is bolted to the support 3. FIG. 9 also shows two vertical stiffeners 208 (respectively 108) positioned opposite the junction of the two lateral reinforcement parts 204 (respectively 104) with the base reinforcement part 203 (respectively 103). These vertical stiffeners 208 (respectively 108), here shown in a direction transverse to the cutting plane, may also be configured in a plane longitudinal to the cutting plane. These vertical stiffeners 208 (respectively 108), whether they are transverse or longitudinal to the cutting plane, allow a better torsional rigidity of the assembly of the first leg 20 (respectively second leg 10) to the support 3. FIG. 9 shows attachment holes 201 (respectively 101) in the end plate 209 (respectively 109) of the first leg 20 (respectively second leg 10) to allow the attachment of the first leg 20 (respectively second leg 10) with the support 3 by using bolts, rivets or any other attachment means. FIG. 9 shows two holes, but it is also possible to use only one hole, so any embodiment with at least one hole is within the scope of the invention. According to another embodiment, the first leg 20 (respectively second leg 10) is hooked to the support 3 by means of inverted angles positioned on the support 3 that form a hook on which the first leg 20 (respectively second leg 10) is positioned.

Thus, the first leg 20 comprises, as an extension of the radiant structure 2 and/or forming an at least partial envelope of the radiant structure 2, a first leg wall 202A, 202B located between the radiant structure 2 and the first coupling means 25. The vertical end plate 209 is preferably attached to the first leg wall 202A, 202B. The same can be said for the second leg 10.

In the case of the radiant heating tube described in FIG. 5*a*, 5*b*, the radiant structure comprises a first extension to form the first leg wall 202A of the first leg 20 and a second extension to form the first leg wall 202B of the leg 20. The same can be said for the second leg 10.

Figure 10:
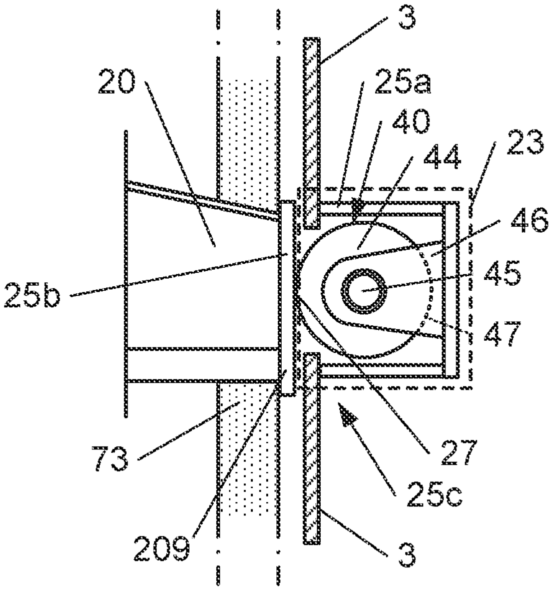
FIG. 10 shows a detailed embodiment of a mechanical coupling of a leg with a support according to the invention.

FIG. 10 shows an example embodiment of a roll bearing means 40 for mechanically coupling a first leg 20, or a second leg 10, or a third leg 30 to the support 3. The roll bearing means 40 shown in FIG. 10 is described in connection with the first leg 20. This roll bearing means 40 can be used for the second leg 10, or easily adapted for the third leg 30, by positioning it such that it allows a displacement in a substantially horizontal direction and a third leg having a third leg end plate 309. The embodiment of FIG. 10 thus applies to a third leg mutatis mutandis.

The roll bearing means 40 is comprised in the first coupling means 25. The roll bearing means 40 comprises a wheel 44 (part of the interface 25*c*) positioned for rotation about a wheel axis 45 (part of the first portion 25*a* of the coupling means 25). The wheel axle 45 is attached to the support 3 by a support 46 of wheel axle 45. In the example shown in the figure, the roll bearing means 40 is positioned in a recess of the support 3, so that the wheel 44 protrudes from the support 3 to allow the displacement of the first leg 20, relative to the support 3, without friction with the support 3. For example, the wheel 44 protrudes from 0.5 mm to 50 mm, more preferably the wheel 44 protrudes less than 20 mm from the support 3. The roll bearing means 40 is positioned at the level of a first mechanical coupling area 23. The first leg 20 comprises a first leg end plate 209 forming a substantially planar surface of first leg for mechanically contacting the wheel 44 so as to form a lineic contact 27 with the wheel 44. The end plate is part of the second portion 25*b* of the coupling means 25.

According to a particular embodiment shown in FIG. 4*c*, the second portion 25*b* of the first 25 (respectively second 15, respectively third 35) coupling means comprises an end plate 209 (respectively 109, 309) forming a surface of first (respectively second, respectively third) leg substantially planar for mechanically contacting the wheel 44 so as to form a lineic contact 27 with the wheel 44. With respect to the third leg 30 shown in FIG. 4*c*, this has a third leg end plate 309 forming a third leg surface substantially orthogonal to the first wall 71, which necessitates having a roll bearing means offset from those of the first leg 20 and second leg 10.

With respect to the third leg 30 shown in FIG. 7, its third leg end plate 309, forming a third leg surface, is flush with the surface of the second leg end plate 109 and the surface of the first leg end plate 209. The first leg 20, the second leg 10 and the third leg 30 are in contact with bearing means (rotary, with roll 40 or sliding) so that they can describe an essentially vertical translation with respect to the support 3. The support is attached to the wall of an oven in a substantially vertical direction.

According to a preferred variant of FIG. 4*c*, the respective bearing means of the first leg 20, of the second leg 10 and of the third leg 30 comprise stop means (not shown) in order to prevent a too much displacement of the end of the leg 10; 20; 30 (of its end plate) with respect to the support 3 along the first direction 29 for the first leg 20, along the second direction 19 for the second leg 10, or along the third direction 39 for the third leg 30. According to another preferred variant of FIG. 4*c*, the bearing means comprise means for guiding the leg 10; 20; 30 (not shown), which allow a translation only in the first direction 29 for the first leg 20, in the second direction 19 for the second leg 10, or in the third direction 39 for the third leg 30.

The present invention has been described in connection with specific embodiments, which are purely illustrative and should not be considered limiting. In a general manner, the present invention is not limited to the examples illustrated and/or described above. The use of the verbs "comprise", "include", or any other variant, as well as their conjugations, can in no way exclude the presence of elements or constituents other than those mentioned. The use of the indefinite article "a", or the definite article "the", to introduce an element or a constituent does not exclude the presence of a plurality of these elements or of these constituents. The reference numbers in the claims do not limit their scope.

In summary, the invention can also be described as follows. Radiant element 1 for heating an oven 200 and comprising:

- a first end 7;
- a second free end 8;
- a radiant structure 2 between the first end 7 and second end 8;
- a conduit 5 for an energy feed inside the radiant structure 2;
- a first attachment leg 20 for mechanically coupling the radiant structure 2 to a support 3, at the level of a first coupling area 23,
- a first coupling means 25 for mechanically coupling the first leg 20 to a support 3 at the level of the first coupling area 23 while allowing a relative displacement between the first leg 20 and the support 3.

The invention claimed is:

1. A radiant element configured for placement on a first vertical wall of an oven, comprising:

- a first end located on a first side of the radiant element;
- a second end located on a second side of the radiant element, the second side being opposite the first side;
- a radiant structure for heating inside the oven, located between the first end and the second end;
- a conduit for an energy feed inside the radiant structure, the conduit being located on the first side of the radiant element;
- a first attachment leg for mechanically coupling the radiant structure to a support located on the first vertical wall, the first attachment leg being located on the first side of the radiant element; and
- a first coupling means for mechanically coupling the first attachment leg to the support, wherein the first attachment leg is only present internally within the oven, the first coupling means configured to allow relative displacement of the first attachment leg with respect to the support;

wherein the second end is free; and wherein the first coupling means comprises:

- a first portion arranged to be stationary with respect to the support, and
- a second portion stationary relative to first attachment leg, the first portion and the second portion being mechanically coupled via a first interface to allow for a relative displacement between the first portion and second portion, wherein said first interface allows a sliding and/or a rolling of the second portion with respect to the first portion, to allow a vertical displacement of the first coupling means.

2. The radiant element of claim 1, wherein the first interface is at a lower temperature than the interior of the oven.

3. The radiant element of claim 1, further comprising an insulator arranged to form a thermal insulation between, on the one hand, the radiant structure and/or the interior of the oven, and, on the other hand, the first interface.

4. The radiant element of claim 1, wherein the first attachment leg is provided to be in support or in traction on said support by means of the first coupling means.

5. The radiant element of claim 1, wherein the first coupling means allows a relative displacement parallel to the first vertical wall between the first attachment leg and the support.

6. The radiant element of claim 1, wherein the first attachment leg comprises, in the extension of the radiant structure and/or forming an at least partial envelope of the radiant structure, a first leg wall located between the radiant structure and the first coupling means.

7. The radiant element of claim 1, wherein the second portion of the first coupling means comprises a vertical first leg end plate.

8. The radiant element of claim 1, wherein it comprises a second attachment leg for mechanically coupling the radiant structure to the support, and a second coupling means for mechanically coupling the second attachment leg to the support; the second attachment leg being positioned around the conduit or positioned on a different side of the conduit than the first attachment leg; the second coupling means comprising: a first portion arranged to be stationary with respect to the support, and a second portion stationary with respect to the second attachment leg, the first portion and the second portion being mechanically coupled via a second interface to allow for a relative displacement between the first portion and the second portion.

9. The radiant element of claim 8, wherein at least one of the first and second attachment legs comprises at least one opening.

10. The radiant element of claim 9, wherein the second leg comprises, in the extension of the radiant structure and/or forming an at least partial envelope of the radiant structure, a second leg wall located between the radiant structure and the second coupling means.

11. The radiant element of claim 8, wherein the second attachment leg comprises, in the extension of the radiant structure and/or forming an at least partial envelope of the radiant structure, a second leg wall located between the radiant structure and the second coupling means.

12. An oven segment of an oven comprising a first vertical oven wall and a first radiant element of claim 1, the support of the first radiant element being located only on the first oven wall, preferably the support of the first radiant element being attached only to the first oven wall.

13. The oven segment of claim 12, wherein the first attachment leg is located lower than the conduit.

14. An oven comprising a plurality of oven segments of claim 13.

15. An oven comprising a plurality of oven segments of claim 12.

16. An oven comprising a plurality of radiant elements of claim 1.

17. A method for attaching a radiant element to a first vertical wall of an oven for heat treating a product, the method comprising the following steps:

a. providing a radiant element comprising:

- a first end located on a first side of the radiant element;
- a second end located on a second side of the radiant element, the second side being opposite the first side;
- a radiant structure for heating inside the oven, located between the first end and second end;
- a conduit for an energy feed inside the radiant structure, the conduit being located on the first side of the radiant element;
- a first attachment leg located on the first side of the radiant element; and
- a first coupling means comprising:
- a first portion, and
- a second portion stationary with respect to the first attachment leg, the first portion and the second portion being adapted to be mechanically coupled via a first interface to allow for a relative displacement between the first portion and second portion; and b. placing said radiant element on the first vertical wall so that:

the second end is free;

the first attachment leg mechanically couples the radiant structure to a support located on the first vertical wall;

the first coupling means mechanically couples the first attachment leg to the support, wherein the first attachment leg is only present internally within the oven, the first coupling means configured to allow free relative displacement of the first attachment leg with respect to the support;

the first portion of the first coupling means is stationary relative to the support; and the second portion of the first coupling means is mechanically coupled to the first portion via the first interface to allow for a relative displacement between the first portion and second portion;

wherein said first interface allows a sliding and/or a rolling of the second portion with respect to the first portion, to allow a vertical displacement of the first coupling means.

* * * * *